United States Patent [19]
Donche et al.

[11] Patent Number: 5,330,015
[45] Date of Patent: Jul. 19, 1994

[54] APPLICATION OF SCLEROGLUCAN MUDS TO DRILLING DEVIATED WELLS

[75] Inventors: Alain Donche, Jurancon; Alain Vaussard, Pau; Patrick Isambourg, Saint Lys, all of France

[73] Assignee: Societe Nationale Elf Aquitaine, Courbevoie, France

[21] Appl. No.: 920,280

[22] PCT Filed: Dec. 19, 1991

[86] PCT No.: PCT/FR91/01032
§ 371 Date: Oct. 13, 1992
§ 102(e) Date: Oct. 13, 1992

[87] PCT Pub. No.: WO92/11340
PCT Pub. Date: Jul. 9, 1992

[30] Foreign Application Priority Data
Dec. 21, 1990 [FR] France ................. 90 16067

[51] Int. Cl.$^5$ .................. C09K 7/02; E21B 21/00
[52] U.S. Cl. ........................ 175/61; 175/62; 175/65; 507/110
[58] Field of Search ................. 175/61, 62, 69; 507/110

[56] References Cited

U.S. PATENT DOCUMENTS

| | | | |
|---|---|---|---|
| 3,301,848 | 1/1967 | Halleck | 507/110 |
| 4,640,358 | 2/1987 | Sampath | 166/274 |
| 4,900,457 | 2/1990 | Clarke-Sturman et al. | 252/8.551 X |

FOREIGN PATENT DOCUMENTS

0146981  7/1985  European Pat. Off. .

*Primary Examiner*—George A. Suchfield
*Attorney, Agent, or Firm*—Birch, Stewart, Kolasch & Birch

[57] ABSTRACT

A method for drilling deviated or horizontal wells is facilitated by the use of a scleroglucan-containing aqueous drilling mud. The use of such drilling muds is environmentally and economically advantageous over the use of oil-based drilling muds and is superior to the use of other aqueous-based drilling muds in terms of lubricating power and carrying capacity. Preferably the drilling mud contains unrefined scieroglucan.

8 Claims, 1 Drawing Sheet

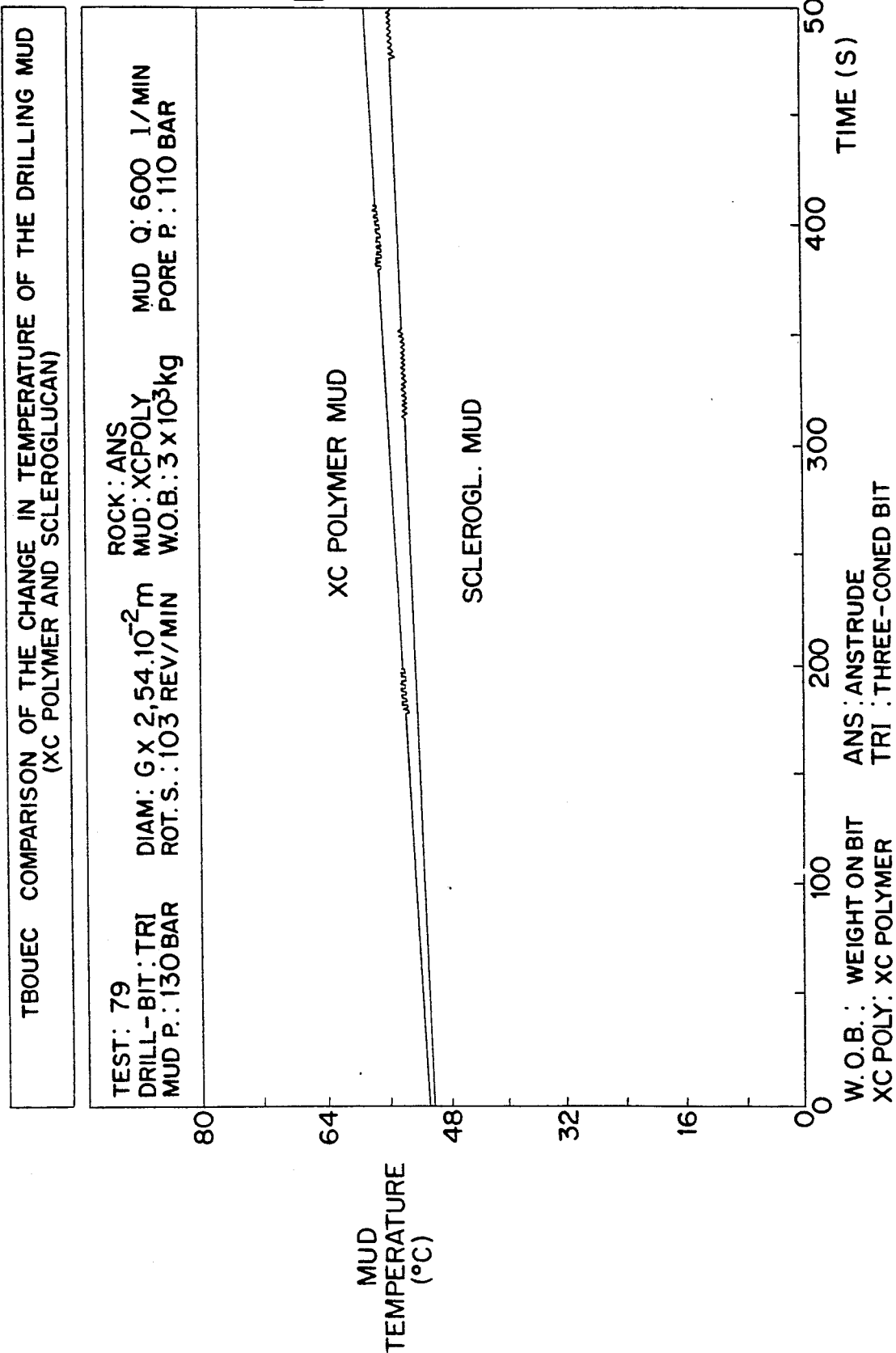

1

APPLICATION OF SCLEROGLUCAN MUDS TO DRILLING DEVIATED WELLS

BACKGROUND OF THE INVENTION

1. Field of the Invention

The present invention relates to the application of a mud comprising scleroglucan to horizontal or directional boreholes and in particular to boreholes having a deviation angle with respect to the vertical of between 40° and 70°.

2. Description of the Related Art

The drilling mud is a more or less complex mixture of a base liquid, water or oil, and various products, used for drilling wells. This mud, injected in the drill-pipe string, circulates by a rising movement in the annular space contained between the walls of the geological formations drilled and the pipe string.

In the case of vertical drilling, the flow of the mud in the annular space is most often of the laminar type. This flow ensures removal of the cuttings dislodged at the working face which are transported toward the surface in the annular space and removed at the surface. Bailing-up of the drilling bit is thus avoided.

In laminar flow, a particle situated at the centre of the annular space has a velocity greater than the average velocity and a velocity less than the average velocity in the vicinity of the walls of the formations or of the pipe string. A particle transported to a point of low velocity will have a tendency to topple or to stay there. If the flow rate is too low, every particle will have a tendency to go back down because of gravity. In order to avoid this phenomenon and to ensure good cleaning of the drilling well, it is most often sufficient in vertical drilling to increase the viscosity of the mud so that its carrying capacity is such that the drill-cuttings can be held in quasi-suspension in the mud when the flow rate of the latter is zero.

In the case of deviated wells, however, these phenomena of falling back under gravity are more difficult to avoid and most often veritable beds of cuttings of variable thickness which are formed along the lower generatrix of the well are observed. These accumulations can be particularly big in the region of changes in the degree of inclination of the well, in the curves of the drilling, and can in consequence reduce the quality of the cleaning of the well and cause increased problems of friction and thus decrease the rate of penetration of the well, or indeed cause blocking of the drilling. In the case of drilling with a water-based mud, the solution usually employed for freeing and removing or reducing the accumulations of drill-cuttings during drilling of deviated wells consists most often in causing a change of the flow conditions. For this purpose, for example fixed volumes of a mud having a viscosity considerably less than or considerably greater than that used under normal conditions are periodically injected into the well in order thus to cause either turbulent conditions characterised by equal velocities throughout the annular space, or plug conditions characterised by velocities which are practically constant and of the same direction throughout the annular space. In practice, however, this solution turns out to be tricky to implement and the results obtained are highly random.

Another solution to limit the problem of accumulation of drill-cuttings during drilling of deviated wells consists in employing as the drilling mud not a water-based mud but an oil-based mud.

Oil-based muds are characterised by a Bingham-type rheological behaviour with the existence of a viscosity even at very small shears. The muds retain this characteristic in conditions at the bottom of a well and at high temperature. Most of the time, the muds consist of an emulsion of water in 30 to 40 % by volume of oil. If the viscosity of the emulsion is not sufficient, it is adjusted to the desired value by the addition of inorganic colloids such as bentonite for example.

It is noticed that, with the use of oil-based muds, accumulations of drill-cuttings and problems connected with these accumulations are less critical than with water-based drilling. Oil-based muds furthermore have a much higher lubricating power than water-based muds.

These muds however are not only expensive but can be tricky to employ, in particular in offshore drilling, but above all they are extremely polluting to the point that the legislation of some countries forbids their disposal. The muds and the cuttings which they carry up must therefore increasingly be processed at the surface in order to avoid any pollution.

This is why in drilling oil-based muds are used only in a very limited number of cases.

Furthermore, the introduction of solids in order to adjust the viscosity amongst other things increases the risks of clogging and complicates the problems of removal at the surface.

SUMMARY OF THE INVENTION

It has now been found that the addition of a biopolymer called scleroglucan, which is known as a viscosity-increasing agent which can be used over wide ranges of temperature, salinity and pH, to a water-based mud used for drilling deviated wells allows the accumulations of drill-cuttings to be decreased while avoiding the disadvantages connected with the use of oil-based muds.

The subject of the invention is the application of a water-based mud comprising amongst other constituents a useful quantity of scleroglucan to the drilling of horizontal or deviated wells. Deviated wells are understood to mean wells at an angle of between 0° and 90° with respect to the vertical. The application according to the invention however is particularly advantageous in the case of wells whose deviation angle with respect to the vertical is between 40° and 70°. The useful quantity of scleroglucan for the application according to the invention is advantageously between 2 and 20 kilograms per cubic meter of mud. Advantageously, unrefined scleroglucan will be used in a quantity preferably between 4 and 10 kilograms per cubic meter of mud.

BRIEF DESCRIPTION OF THE DRAWINGS

FIG. 1 shows the results of the lubricating power test of Example 2.

DETAILED DESCRIPTION OF THE INVENTION

The scleroglucans which enter into the composition of the muds in the applications according to the invention are nonionic water-soluble homopolysaccharides of molecular weights exceeding 500 000 whose molecules are constituted by a main linear chain formed of D-glucose units linked by $\beta 1,3$ bonds and of which one in three is linked to a side D-glucose unit by a $\beta 1,6$ bond. These polysaccharides are obtained by fermenting a sugar and inorganic salt-based medium under the action of a microorganism of the Sclerotium type. A more complete description of the scleroglucans and of their preparation can be found in the reference U.S. Pat. No. 3,301,848, whose content is incorporated by reference into the present description.

As a source of scleroglucan, it is possible, for example, to make use according to the invention of the scleroglucan isolated from the fermentation medium, the said product being in the form of a powder or alternatively of a more or less concentrated solution in an aqueous and/or hydroalcoholic solvent, or alternatively to use the liquid reaction medium from the fermentation, which contains the scleroglucan in solution.

Advantageously, the scleroglucan used for the application according to the invention is unrefined, that is to say that it contains all or part of the mycelium of the producing fungus.

In the case of drilling of deviated wells, the introduction into any water-based mud of a useful quantity of scleroglucan permits better cleaning of the well and therefore permits the cases of excessive accumulation under gravity of drill-cuttings in the wells to be limited, in particular in the case of deviated wells. The invention also relates to a process for improving water-based muds in the case of drilling of horizontal or deviated wells, characterised in that a useful quantity, preferably between 4 and 10 kilograms per cubic meter of a mud, of preferably unrefined scleroglucan is added as a constituent of the mud. This consequently avoids having to employ processes whose efficiency is not certain, manifested most often by an increase in the drilling time, or else having to employ an oil-based mud. In relation to the use of an oil-based mud, the use of a water-based mud to which scleroglucan is added has numerous advantages. In addition to the economic advantages, the suppression of possible risks linked with safety of implementation and the removal of all pollution problems, the addition of scleroglucan into a water-based mud permits controlled modification of the type of flow in the annular space of the well and in particular of the velocity profile. The control is carried out without putting solids into the mud. For a given mud and given geometrical well characteristics, there exists a direct relation between the quantity of scleroglucan used and the velocity gradient of the mud in the annular space of the well: the transition from laminar flow to plug flow is made by simple addition of a determinable quantity of scleroglucan. In relation to a simple water-based mud, the addition of scleroglucan improves the carrying capacity of the mud, that is to say its ability to keep drill-cuttings in suspension without there being any redeposition. As the scleroglucan transmits to the mud a part of its known remarkable properties, the mud obtained after addition can only be improved compared to the initial mud. It seems in particular that the muds are more lubricating after addition of scleroglucan than before. The introduction of mycelium does not modify these properties contributing to the improvement of the transport of the drill-cuttings by the mud. It seems, on the contrary and surprisingly, that the introduction of mycelium makes it even more efficient.

The advantages of a mud composed of a useful quantity of scleroglucan in dilution in any aqueous base and its importance for the application according to the invention are illustrated by the following examples given without limitation, starting from complex muds which are not specially intended for the application according to the invention.

The equipment used for the measurements is standardised (API RP 13 committee standards). The viscosity of the solutions tested was measured using a Fann viscometer at six speeds, namely 600, 300, 200, 100, 50 and 30 revolutions per minute, each corresponding to a velocity gradient expressed in $s^{-1}$, respectively 1020, 510, 340, 170, 85 and 51 $s^{-1}$. The Fann viscometer provides a measurement of shear stress which is called Fann reading and is expressed here in pascals. The Fann viscometer is an apparatus with coaxial cylinders whose rotor is driven by an electric motor. The shear strength of the mud contained in a beaker in which the coaxial cylinders are immersed is measured. The shear strength is read on a graduated dial at different speeds of rotation of the rotor. The viscosity of the mud causes a rotation of the stator, indicated on the read off dial.

The filtration measurements are carried out after thirty minutes using an API filter press and are expressed in milliliters.

The scleroglucan used is made by Sanofi Bio Industries starting from a Sclerotium rolfsii strain. An unrefined grade was used, containing of the order of 25 % of mycelium residues and marketed under the name "Artigum CS6".

The theological characteristics are indicated by giving viscosities expressed in pascal-seconds (Pas), but also magnitudes called "gels"; an apparent viscosity AV, a plastic viscosity PV, and a "yield value" YV currently used by specialists in drilling muds. "Gel 0" and "gel 10", measured with the Farm viscometer, permit the thixotrophy of the mud to be assessed, that is to say its tendency to gel when the fluid is stationary. This pseudoplastic property is characterised by a flow threshold below which the fluid stays stationary, and a more or less rapid decrease in viscosity as soon as flow is present.

In order to obtain the value of the gels, the operating procedure is the following: the rotor of the viscometer is spun at 600 rev/min for 30 s, then the motor is stopped. After waiting 10 s the motor is set in rotation at 3 rev/min. The maximum resulting deviation constitutes the initial gel or "gel 0". The mud is allowed to rest for 10 min. The maximum number constitutes its "gel 10".

In order to obtain the apparent viscosity of the mud in centipoises, the Fann reading at 600 rev/min is divided by two. The calculation of the plastic viscosity is carried out by taking the difference between the Fann reading at 600 rev/min and the Fann reading at 300 rev/min. The yield value is obtained by taking the difference between the apparent viscosity and the plastic viscosity, and multiplying this difference by two. The yield value expresses the minimum stress below which there is no flow in the case of laminar flow conditions.

EXAMPLE 1

Evaluation of the carrying capacity

An attempt was made to study the carrying capacity indices YV/PV of bentonitic fluids whose characteristics are close to a scleroglucan CS6 mud comprising, per liter of soft water, 4 g of CS6 M (with wetting agent), 20 g of Clarsol bentonite, 75 g of natural clay and some sodium hydroxide in order to obtain a pH equal to 9.6.

| Composition of the bentonitic muds | | | |
|---|---|---|---|
| | Simplified bentonitic muds | | Weekly treated bentonitic mud |
| | 1 | 2 | 3 |
| Soft water | 1 l | 1 l | 1 l |
| Bentonite | 60 g | 60 g | 65 g |
| Clarsol FB2 sodium hydroxide | to pH 9.2 | to pH 9.2 | to pH 9.5 |
| Natural clay | 75 g | 75 g | 75 g |
| "CMC LV" | 0 g | 5 g | 0 g |
| Lignosulphonate | 0 | 0 | 1 g |

| Results of measurements in the case of bentonitic muds | | | | |
|---|---|---|---|---|
| Fann | 600 Pa | 30.6 | | 19.1 |
| | 300 Pa | 17.2 | | 11 |
| | 200 Pa | 13.4 | | 8.6 |
| | 100 Pa | 9.6 | | 5.3 |
| | 60 Pa | 7.2 | | 3.3 |
| | 30 Pa | 5.7 | | 2.4 |
| gel | 0 Pa | 2.9 | | 0.5 |
| gel | 10 Pa | 9.6 | | 1 |
| AV | Pas | $32 \times 10^{-3}$ | | $20 \times 10^{-3}$ |
| PV | Pas | $28 \times 10^{-3}$ | | $17 \times 10^{-3}$ |
| YV | Pa | $8 \times 0.478$ | | $6 \times 0.478$ |
| API | filtrate | 15.5 | 12 | 15 |

| Results of the measurements in the case of the scleroglucan mud | | |
|---|---|---|
| Fann | 600 Pa | 21 |
| | 300 Pa | 14.8 |
| | 200 Pa | 12.4 |
| | 100 Pa | 9.6 |
| | 60 Pa | 8.6 |
| | 30 Pa | 6.7 |
| Gel | 0 Pa | 5.7 |
| Gel | 10 Pa | 13 |
| AV | Pas | $22 \times 10^{-3}$ |
| PV | Pas | $13 \times 10^{-3}$ |
| YV | Pa | $18 \times 0.478$ |
| API | filtrate | 9.7 |

"CMC LV" is a carboxymethyl cellulose.

Aged fluids were used whose properties are stabilised. It is noted that the simplified bentonitic muds have a carrying capacity index YV/PV which is unfavourable, this index being ideally between 1.5/1 and 1/1. The mud which is slightly improved by addition of lignosulphonate as a dispersing agent has a better index inasmuch as the ratio YV/PV is closer to unity than in the preceding cases. It is noted, however, in the last case that an improvement of the index goes hand in hand with a marked decrease in the viscosity and a reduction in the very significant thixotropy (the gels), which leads to a very insufficient carrying capacity at rest.

EXAMPLE 2

Lubricating power of a scleroglucan mud.

The lubricating power of a scleroglucan mud and a xanthan mud is compared. The comparison of the lubricating powers is carried out by circulation of the muds on a drilling test bed and measurement of their heating with the drilling time. The slower the increase in temperature, the better the lubricating power.

The conditions under which the tests were carried out are the following:

| | |
|---|---|
| Bentonite FB 2 | 20 g/l |
| CMC | 2 g/l |
| Scleroglucan (CS6) or xanthan (SC polymer) | 5 g/l |
| Sodium hydroxide to adjust the pH to between | 8.5 and 9 |

Drill bit

Six-inch three-cone bit, J3 type with three 14/32 flow beans
Speed of rotation: 103 revolutions/min
Weight on the drill bit: 3 tonnes Mud
Mud flow rate: 600 liters/min
Mud pressure: 130 bars
Pressure: 110 bars Rock Anstrude (oolitic skeletal limestone)
The results are presented in the attached FIG. 1 which represents the variation in the temperature of the mud during the drilling tests.

The lower heating of the scleroglucan mud compared to the xanthan mud is noticeable. This difference—approximately 40 % at the end of operation—is characteristic of a better lubricating power of the scleroglucan mud.

We claim:

1. A method of drilling deviated wells, which comprises:
   drilling a borehole at an angle greater than 0° and less than or equal to 90°, with respect to vertical, in the presence of a water-based drilling mud;
   said mud comprising water and scleroglucan.

2. The method according to claim 1, wherein said drilling is carried out at an angle between 40° and 70°, with respect to the vertical.

3. The method according to claim 1, wherein said drilling mud comprises 2 to 20 kilograms of scleroglucan per 1 cubic meter of drilling mud.

4. The method according to claim 3, wherein said drilling mud comprises 4 to 10 kilograms of scleroglucan per 1 cubic meter of drilling mud.

5. The method according to claim 4, wherein said scleroglucan is unrefined.

6. The method according to claim 1, wherein said scleroglucan has a molecular weight greater than 500,000.

7. The method according to claim 1, wherein said drilling mud further comprises bentonite.

8. A method of drilling deviated wells, which comprises:
   drilling a borehole into a geological formation at an angle greater than 0° and less than or equal to 90°, with respect to the vertical, to thereby extend said borehole; and
   injecting into said borehole, during said drilling, a water-based drilling mud that comprises water and scleroglucan.

* * * * *